United States Patent [19]
Arrigoni et al.

[11] 3,950,981
[45] Apr. 20, 1976

[54] AUTOMATIC SYSTEM FOR SUPPRESSING THE GROUND NOISE OF APPARATUS FOR MEASURING THE KNOCKING

[75] Inventors: Virgilio Arrigoni, San Donato Milanese; Bruno Gaetani, Milan; Afro Manotti, San Donato Milanese, all of Italy

[73] Assignee: Snam Progetti S.p.A., San Donato Milanese, Italy

[22] Filed: Sept. 23, 1974

[21] Appl. No.: 508,166

[30] Foreign Application Priority Data
Sept. 24, 1973 Italy................................. 29254/73

[52] U.S. Cl. .................................................. 73/35
[51] Int. Cl.² ......................................... G01N 33/22
[58] Field of Search ......................................... 73/35

[56] References Cited
UNITED STATES PATENTS
3,393,557  7/1968  Brown et al. ............................ 73/35
3,456,493  7/1969  Roddick ................................. 73/35

*Primary Examiner*—James J. Gill
*Attorney, Agent, or Firm*—Ralph M. Watson

[57] ABSTRACT

A system for automatically suppressing any ground noise present in the detection of periodic phenomena comprising detecting means for detecting the signal occurring just prior to the occurrence of the periodic phenomena, which signal is representative of ground noise, converting means for converting the sensed signal to a usable D.C. level signal, sampling means for sampling the signal resulting from the occurrence of the periodic phenomena, and summation means for algebraically adding the converted D.C. signal to the sampled signal for eliminating any ground noise present in the sampled signal, thereby providing an output signal representative of the periodic output phenomena free of any ground noise.

8 Claims, 3 Drawing Figures

AUTOMATIC SYSTEM FOR SUPPRESSING THE GROUND NOISE OF APPARATUS FOR MEASURING THE KNOCKING

The present invention refers to an improvement in apparatus for measuring "knocking" by detection of the typical pressure oscillations or of the oscillations of the head or other parts of the engine.

In these apparatus besides the signal relating to the knock, there are always noise signals present usually due to the action of machine members, pressure resonances and electrical noises.

Noise signals are generally suppressed by means of filtering systems and sampling techniques.

In the present technique the intensity of the ground noise is determined by testing a fuel at an octane level such to exclude the knock phenomena; in this case the obtained signal is clearly due to noises. The so determined value is then subtracted, after having carried out the measurements, from the detected values.

In other cases the ground noise is directly suppressed by superimposing on the instrument signal another signal having an opposite sign and a value equal to the one measured for the "ground noise".

The ground noise depends on different parameters and particularly on the engine revolving speed. So in some apparatus the signal applied for compensating the ground noise is allowed to vary as a function of the engine speed. In other apparatus such a signal is connected with the total value of the signal detected by an auxiliary pickup arranged so as to be little influenced by the detonation. Also in this case, besides requiring a second pickup, the detected noise level may present different patterns and is, in any case, influenced more or less by the arising knock.

The present systems present drawbacks such as not being automatic or of not taking into account all the parameters influencing the ground noise, and in any case do not provide good compensation for the ground noise phenomenon. It is well known that phenomena relating to the knock appear after the moment of highest pressure and disappear for a certain value of the crankshaft angle; for improving the signal/noise ratio the instruments for detecting the knock, measure the signal value only within this angle, see Italian Pat. No. 908.122, and its corresponding U.S. patent application Ser. No. 522,272, filed Nov. 8, 1974.

The operation of the system of the present invention is based on the following principle: the ground noise, defined as noise present within the interval of appearance of the "knocking", may be correlated with the noise level present in the residual interval of the same engine cycle, preceding the one of the knock rise. For simplicity sake the total path covered by the piston in a cycle has been subdivided into two intervals, the former relating to the knock rise the latter to its absence.

Accordingly to compensate for the signal relating to the ground noise it is sufficient to subtract from the total signal, comprising both knocking and ground noise, a signal proportional to the intensity of the noise present in that part of the cycle preceding the knocking.

Since the beginning of the knocking occurs, generally, at the highest pressure, the sampling of the noise may take place, e.g., between the ignition moment and the highest pressure moment.

However, it is desirable that the beginning of such a sampling not be advanced too much in order to avoid the possible "tail" of the vibrations resulting from the detonation of the fuel in the cylinder caused by the preceding ignition.

The main object of the present invention is therefore to provide an automatic system for suppressing the ground noise in apparatus suitable for measuring the knocking of internal combustion engines. Said object is achieved by deriving a signal from an interval of time just preceding the knocking interval and algebraically adding it to the signal detected during the knocking interval.

For a better understanding of the object of the present invention reference is made to a possible diagram realization given only by way of example, since many equivalent variants are always possible.

Figure 1:
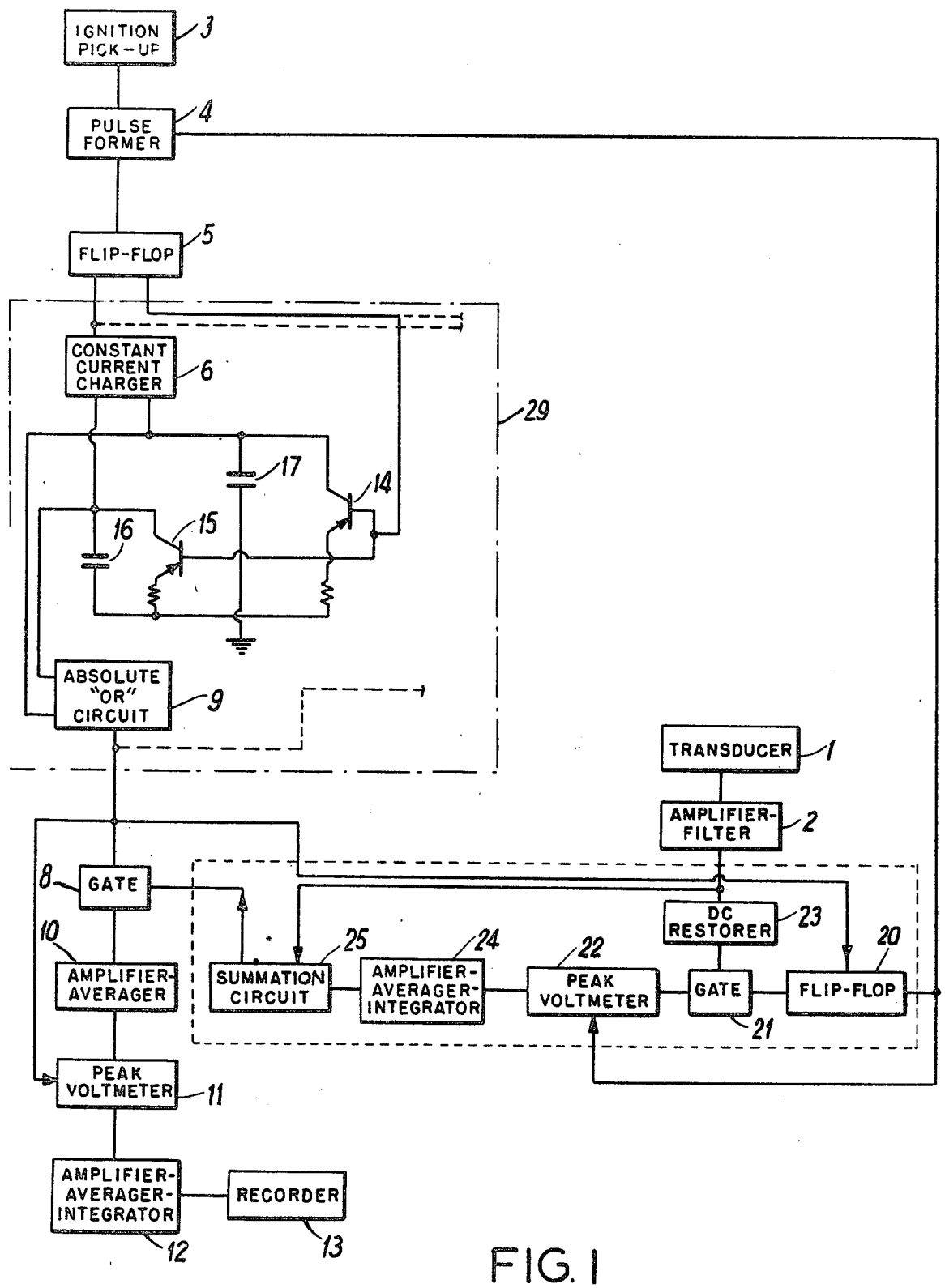
FIG. 1 shows a possible block diagram of an apparatus for measuring the knocking of an internal combustion engine, the automatic system for suppresing the ground noise according to the present invention being arranged within the smaller dashed block.
Figure 3:
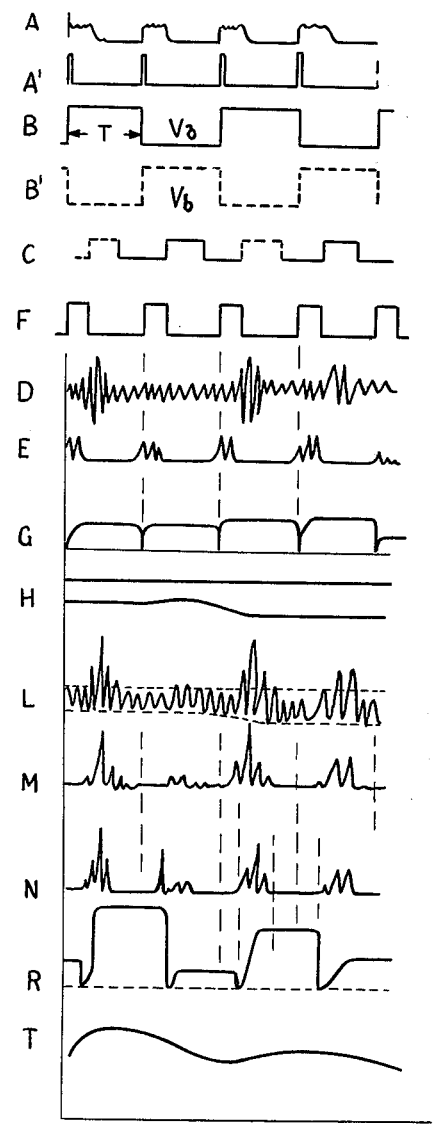
FIG. 3 illustrates a plurality of waveforms resulting from the apparatus to facilitate understanding of the operation of the apparatus.

Referring to FIGS. 1 and 3, ignition signal A, coming from ignition pickup 3, reaches pulse forming device 4 which delivers pulses A' synchronous with ignition signals A and having constant amplitude and duration. Signal A' acts on a flip-flop 5 whose outputs provide signals B and B' respctively.

Signals B, B', coming from flip-flop 5, reach block 29 forming signals C suitable to control gate 8.

Block 29 includes a constant current charger 6 for integrating and loading capacitors 16 and 17, constant current discharge devices 14 and 15 and absolute "OR" logic circuit 9. Logic circuit 9 may advantageously include two squaring ammplifiers and an exclusive "or" circuit.

Block 29 is intended to represent symmetric blocks (the other block is not shown, but receives dashed line inputs from the flip-flop 5 and provides a dashed line output to the gate 8). Inputs B' and B to the symmetric block are inverted as compared with the inputs of block 29. Block 29 is not described in detail since it is described in the aforementioned Italian Patent of the same applicants (Italian Pat. No. 908.122). Block 29 provides a pulse train of signals corresponding to waveform C in FIG. 3. The width or interval of each pulse of waveform C is determined by the discharge of capacitors 16 and 17 which occurs at constant current via transistors 14 and 15. As shown with reference to FIG. 3, the beginning of each pulse of waveform C corresponds with the highest pressure point (end of pulse of waveform A) and the termination of each pulse of waveform C occurs prior to the beginning of the next ignition signal and generally corresponds to a particular crankshaft angle beyond the highest pressure point.

Gate 8 receives signal M which is obtained as follows. General transducer 1 detects the vibrations due to knocking and delivers the signals to the amplifier-filter 2. Signal D, including the knocking signal together with ground noise is fed to the amplifier filter 2. The output from 2, is applied, on one hand, to summation device 25 and, on the other hand, to a D.C. restorer circuit 23 and then to a gate 21. D.C. restorer circuit 23 rectifies signal D coming from amplifier-filter 2.

Gate 21 allows the signal coming from the D.C. restorer 23 to pass only in presence of signal F coming from flip-flop 20.

Flip-flop 20 is made conductive by ignition pulse A' and then reset by the first front of signal C. Signal E coming from gate 21, representing the vibration intensity just before the knocking rise, is applied to peak voltmeter 22 which is reset by pulses A' coming from the ignition.

Signal G coming from peak voltmeter 22 is applied to an amplifier-inverter-integrator circuit 24.

Signal H coming from amplifier-averager-integrator 24 is applied to summation circuit 25. Signal M, leaving summation circuit 25, consists therefore of signal D minus signal H relating to the ground noise. In gate 8 therefore signals C coming from blocks 29 allow the passage of signals M coming from summation circuit 25 and it is possible to obtain in this way signal N applied to low time-constant integrator 10 and herefrom to a peak voltmeter 11 reset by the first front of signal C. Signal R coming from peak voltmeter 11 is averaged by integrating circuit 12, which delivers signal T, relating only to the knocking intensity (i.e. without ground noise). Block 13 represents an element for recording, indicating and the like.

Figure 2:
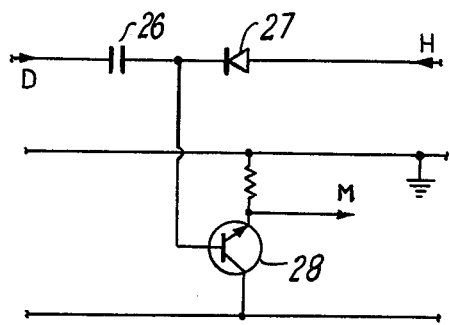
FIG. 2 is a circuit diagram of a summation circuit for carrying out the superposition of the signal for compensating for ground noise on the signal detected during knocking.

FIG. 2 shows in detail a possible circuit relating to block 25. It comprises a capacitor 26, a diode 27 and a transistor 28 mounted as an emitter-follower. Signal D coming from averager-filter 2 is brought, through capacitor 26 and diode 27, above the (negative) voltage level coming from amplifier-averager-integrator 24 (H).

The output of transistor 28 is therefore the sum of signals D and H; i.e., M. The superimposition of signals D and H are shown as signal L.

The invention provides essentially a system, arranged within the smaller dashed block in FIG. 1, whose role is to allow the automatic suppression of the ground noise of a signal proportional to the vibrations detected by a normal transducer.

Clearly this system for suppressing automatically the ground noise for apparatus in measuring the knocking, of internal combustion engines, may, as such, be used with other apparatus suitable for the detection of periodical phenomena whose signals are always affected with ground noise (e.g. in the field of the geophysical prospectings by means of multiple charges, in medical recording instruments and so on).

What we claim is:

1. A system for automatically suppressing any ground noise present in the detection of periodic phenomena, comprising:

detecting means for detecting the signal occurring just prior to the occurrence of the periodic phenomena which signal is representative of ground noise;

converting means for converting the sensed signal to a usable D.C. level signal;

sampling means for sampling the signal resulting from the occurrence of the periodic phenomena; and summation means for algebraically adding the converted D.C. signal to the sampled signal for eliminating any ground noise present in the sampled signal, thereby providing an output signal representative of the periodic output phenomena free of any ground noise.

2. The system claimed in claim 1, wherein:

said summation means includes a capacitor, a rectifier, and a transistor electrically coupled to provide an output signal representing the algebraic sum of the converted D.C. signal and the sampled signal.

3. The system claimed in claim 1 in which the periodic phenomena to be detected is the knocking signal occurring in an internal combustion engine, wherein:

said detection means detects the signal occurring in the interval just prior to the occurrence of the highest pressure in the operating cycle of the internal combustion engine.

4. The system claimed in claim 3, wherein:

said summation means includes a capacitor, a rectifier, and a transistor electrically coupled to provide an output signal representing the algebraic sum of the converted D.C. signal and the sampled signal.

5. The system claimed in claim 3, wherein:

said converting means includes a D-C restorer circuit, a bistable circuit electrically coupled to a gate, said gate being controlled by said bistable circuit, a peak voltmeter electrically coupled to said gate which is periodically resettable in response to each cycle of the internal combustion engine, and an inverter-integrator circuit for inverting and averaging the output signal from said peak voltmeter to supply a D.C. signal representative of any ground noise to said summation means.

6. The system claimed in claim 5, wherein:

said summation means includes a capacitor, a rectifier, and a transistor electrically coupled to provide an output signal representing the algebraic sum of the converted D.C. signal and the sampled signal.

7. The system claimed in claim 1, wherein:

said converting means includes a D.C. restorer circuit, a bistable circuit electrically coupled to a gate, said gate being controlled by said bistable circuit, a peak voltmeter electrically coupled to said gate which is periodically resettable prior to the occurrence of each periodic phenomenon, and an inverter-integrator circuit for inverting and averaging the output signal from said peak voltmeter to supply a D.C. signal representative of any ground noise to said summation means.

8. The system claimed in claim 7, wherein:

said summation means includes a capacitor, a rectifier, and a transistor electrically coupled to provide an output signal representing the algebraic sum of the converted D.C. signal and the sampled signal.

\* \* \* \* \*